United States Patent [19]

DeWitt et al.

[11] Patent Number: 5,734,709
[45] Date of Patent: Mar. 31, 1998

[54] SYSTEM FOR CUSTOMER CONFIGURATION OF CALL ROUTING IN A TELECOMMUNICATIONS NETWORK

[75] Inventors: Constance Ann DeWitt, Kansas City; Victor Lee Norman, Lee's Summit, both of Mo.; Ravi Chander Rajagopal, Overland Park, Kans.; Keith Jarett, Oakland, Calif.

[73] Assignee: Sprint Communications Co. L.P., K.C., Mo.

[21] Appl. No.: 387,963

[22] Filed: Feb. 10, 1995

Related U.S. Application Data

[63] Continuation of Ser. No. 826,358, Jan. 27, 1992, abandoned.

[51] Int. Cl.$^6$ .................... H04M 3/42; H04M 11/00; H04M 15/00; H04M 7/00
[52] U.S. Cl. .................... 379/207; 379/93.01; 379/113; 379/127; 379/220; 379/265; 379/309; 395/349; 395/974
[58] Field of Search .................... 379/94, 112, 113, 379/136, 201, 207, 219, 220, 221, 265, 266, 309, 134, 127; 395/349, 974

[56] References Cited

U.S. PATENT DOCUMENTS

| | | | |
|---|---|---|---|
| 4,191,860 | 3/1980 | Weber | 379/277 X |
| 4,611,094 | 9/1986 | Asmuth et al. | 379/211 X |
| 4,653,090 | 3/1987 | Hayden | 379/396 X |
| 4,757,267 | 7/1988 | Riskin | 379/219 X |
| 4,782,517 | 11/1988 | Bernardis et al. | 379/201 |
| 4,782,519 | 11/1988 | Patel et al. | 379/275 X |
| 4,788,718 | 11/1988 | McNabb et al. | 379/134 X |
| 5,136,690 | 8/1992 | Becker et al. | 379/122 X |
| 5,241,588 | 8/1993 | Babson, III et al. | 379/127 X |
| 5,270,919 | 12/1993 | Blake et al. | 379/136 X |
| 5,291,550 | 3/1994 | Levy et al. | 379/221 X |

OTHER PUBLICATIONS

J. Bouche et al., "The Freephone Service", commutation & transmission by Sotelec, No. 4, 1986, pp. 91–102.

Fredrik Ljungblom, "A Service Management System for the Intelligent Network", Ericsson Review, No. 1, 1990, pp. 32–41.

U.S. Patent Application, 07/826,334, Anderson, et al., Art Unit 2601, Filed 01/27/92.

*Primary Examiner*—Harry S. Hong
*Attorney, Agent, or Firm*—Harley R. Ball; Michael J. Setter; Jed W. Caven

[57] ABSTRACT

In a telecommunications network operable for routing calls such as 800 calls, to a plurality of customer destinations, a system allows the customer to configure the routing of calls by entering selected call routing criteria such as a call-routing map associated with a time frame for implementation thereof included as part of an overall routing plan. The routing map includes the desired allocation of calls placed from a customer defined origination region to selected ones of the customer's call receiving destinations. Using the customer supplied criteria, the system then composes a set of call-handling statements, also called time features, which the network then compiles into an executable routing scheme for translating the dialed number into the physical number associated with the selected customer destination.

30 Claims, 10 Drawing Sheets

FIG. 3

SYSTEM FOR CUSTOMER CONFIGURATION OF CALL ROUTING IN A TELECOMMUNICATIONS NETWORK

This application is a continuation of application Ser. No. 07/826,358, filed Jan. 27, 1992, and now abandoned.

BACKGROUND OF THE INVENTION

1. Field of the Invention

The present invention relates to the field of telecommunications in which an interexchange carrier network is operable for routing calls to selected ones of a plurality of destinations. More particularly, the invention hereof concerns a system which allows a customer of the network to configure the routing of incoming calls to selected destinations by entering selected call routing criteria as a preferred call-routing plan.

2. Description of the Prior Art

Telecommunications networks, and in particular interexchange carrier networks, are operable to route calls to a plurality of customer destinations according to a routing scheme wherein the calls are placed by dialing a predetermined number. For example, a network customer may have a so-called "800" number which allows calls to be placed toll-free to the caller. When such a number is dialed, the network translates the 800 number into another number which is then used by the network to determine the physical destination of the call.

If a network customer has a plurality of destinations for receiving incoming calls, a call routing scheme can be designed to allocate the calls among the destinations according to various criteria such as the origination area code or area code-NXX combination of the caller, the date, day of the week and the time of day. This routing scheme capability allows calls to be routed for the most efficient handling among the various destinations. For example, one destination may have greater staffing which allows that destination to handle more calls. Thus, the routing scheme may allocate a greater percentage of the calls to this destination. As another example, on holidays, the customer may elect to staff only one destination and have all the calls routed to this one destination. For customers having destinations located in different time zones, calls placed before or after normal working hours of one destination, can be routed to a destination still in operation.

To develop a routing scheme operable by the network, sets of "routing statements" are composed and interlinked with one another. In order to make the composition of these routing statements user friendly, these routing statements are typically formulated and displayed in a decision tree structure called a "routing tree". These sets of routing statements are then used by the network in translating the dialed number into a destination number according to the routing scheme.

As those skilled in the art appreciate, the creation of routing trees is a tedious and often time consuming task, and typically requires someone skilled in both routing tree logic and one who is also familiar with customer requirements. The difficulties which are encountered when one makes even relatively minor changes, likely result in customers making changes to their routing scheme less frequently. In consequence, network capabilities are not fully used for routing calls according to customer criteria because changes are so unwieldy.

Some prior art schemes display graphic representations of a map of the customer's geographic network as defined by the routing statements. Such a map may be display only and be used only for identifying area codes of certain regions, alternatively, the map may simply allow a customer to define certain regions which the customer may set up to use for the same routing scheme. However the systems still require the use of typically complex routing statements or routing trees to define the routing scheme and does little to facilitate reconfiguration according to customer criteria. Thus, the prior art points out the need for a system which is user friendly and simple so that customer personnel who are typically unskilled in network routing tree or routing statement logic can readily reconfigure the routing scheme.

SUMMARY OF THE INVENTION

The present invention allows receipt of customer-defined routing criteria or criteria changes into a criteria-handling device. This device is operable to receive user defined routing criteria including a desired routing plan comprising the desired routing of calls to selected ones of a plurality of user associated call receiving destinations. The device composes in response to the received criteria a set of call handling statements incorporating the criteria for subsequent transformation into an executable routing scheme for operating the network to route calls according to the criteria. The invention also comprises a method of routing calls in a telecommunications network operable for routing telecommunications traffic to selected ones of a plurality of network destinations. The method comprises the steps of receiving, in a criteria-handling device, routing criteria including a routing plan comprising the routing of traffic to selected destinations and the step of composing, in said device in response to entry of said criteria, a set of call-handling statements incorporating the criteria, for subsequent transformation into an executable routing scheme for operating the network to route traffic to the destinations according to said criteria.

The invention includes a method of effecting telecommunications routing changes in a telecommunications network. The steps comprise graphically displaying at least some portion of a routing scheme for routing telecommunications traffic and manipulating the graphical display to depict changes to the routing scheme and the routing changes to the telecommunication traffic are made in accordance with changes depicted to the graphical display.

The invention further includes an apparatus for use with a telecommunications network for routing calls directed to at least one predetermined number to selected ones of a plurality of network destinations. The apparatus comprises a criteria-handling device for receiving user-defined routing criteria including a desired routing plan comprising the desired routing of calls to selected ones of a plurality of call-receiving destinations. The device has a means for composing, in response to receipt of the criteria, a set of call-handling statements incorporating the criteria, for subsequent transformation of the handling statements into an executable routing scheme for operating the network to route calls to the destinations according to the criteria.

The invention also includes a method of operating the network comprising the steps of receiving, in a criteria-handling device, user-defined routing criteria including a desired routing plan comprising the desired routing of telecommunications traffic to selected ones of a plurality of destinations. A set of call handling statements are then composed in the device in response to entry of the criteria, for subsequent transformation of the handling statements into an executable routing scheme for operating the network to route traffic to the destinations according to the criteria. The criteria includes at least the destinations and the allocation of calls thereto. A graphical depiction of the routing plan is presented including destinations, and allocation thereto.

The invention also comprises a telecommunications network comprising a means for selecting a time frame having a routing plan associated with the time frame and a means for graphically displaying the selected routing plan or portion thereof by depicting at least a portion of origination regions from which telecommunications traffic directed toward at least one selected number originates and depicting at least a portion of call destinations to which the traffic terminates.

The invention also includes a telecommunications network comprising means for receiving a network routing plan wherein the plan comprises at least a portion of origination regions from which calls which dial a selected number originate, and at least a portion of call destinations to which the calls dialing the selected number terminate. The network also has a means for receiving an assignment of a time frame for which the routing plan is to be implemented.

BRIEF DESCRIPTION OF THE DRAWINGS

FIG. 3 is an illustration of the preferred calendar graphic;

DETAILED DESCRIPTION OF THE PREFERRED EMBODIMENT

Figure 1:
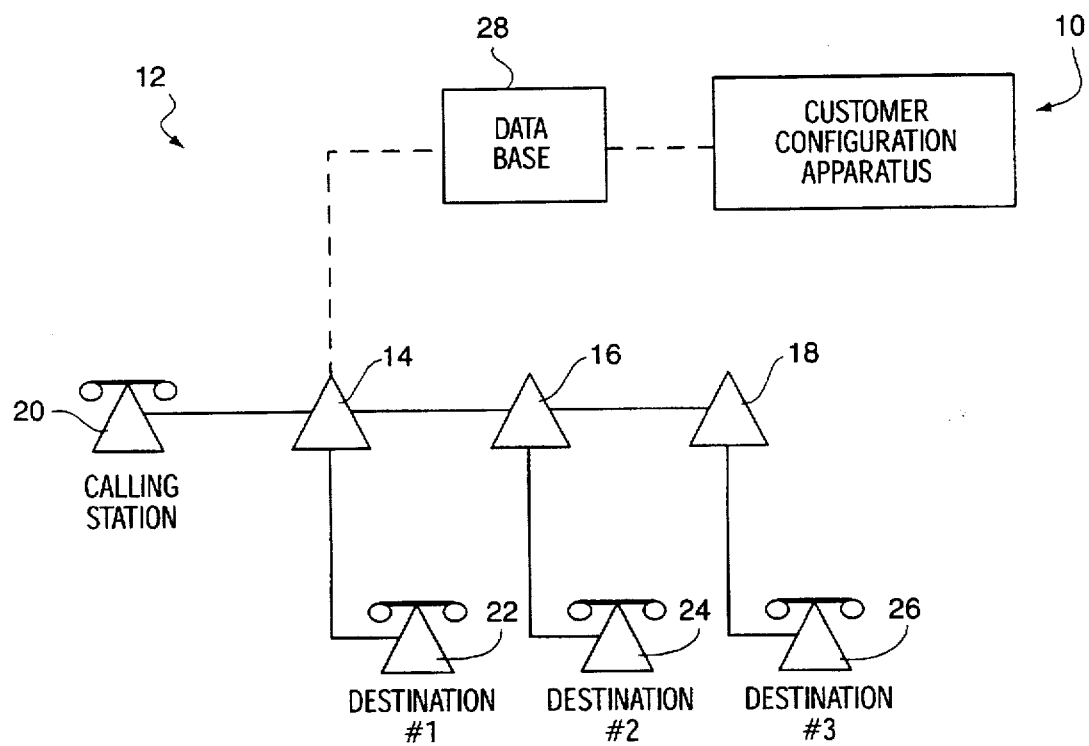
FIG. 1 is a schematic block diagram illustrating the preferred apparatus of the present invention connected with an interexchange carrier network.

Referring initially to FIG. 1, the preferred apparatus 10 of the present invention is shown connected to a telecommunications network and in particular is shown connected to an interexchange carrier network 12. However, it should be understood that other network arrangements, including but not limited to local networks, are equally applicable to the present invention. Network 12 includes switches 14, 16, and 18 interconnected as illustrated and operable to route calls placed from an origination telephone 20 to a plurality of destinations 22, 24 and 26. Additionally, network 12 includes database 28 which communicates with each of the switches through conventional signalling represented by the dashed lines in FIG. 1.

As is well understood by those skilled in the art, interexchange carrier network 12 is operable to route calls placed from an originating station to a destination station according to the dialed number. For example, if a call is originated at station 20, switch 14 receives the call (by way of the local exchange carrier), determines the routing through other switches in the network, and then routes the call to the destination. Special numbers such as so-called "800" or "900" numbers do not represent the physical number of the destination telephone. Because of this, the origination switch must have this special number translated into another number such as a logical number which can then be used to route the call. In order to translate the call, the switch transmits the dialed number to network database 28 through conventional signaling. Database 28 then responds by sending the appropriate logical number to the switch. If a network customer has more than one call handling destination such as stations 22–26 illustrated in FIG. 1, database 28 must translate the dialed number into one of the three physical numbers corresponding to one of the customer destinations. It should be understood that while the present invention is particularly advantageous for use with these special numbers, other numbers which are associated with a customer of the system may be equally applicable to the present invention.

Appendix I illustrates a set of these routing statements for a rather simple example as explained further hereinbelow. The routing statements use information from the network including the date, day of the week, and time of day of call placement to interlink with other statements. As such, a set of routing statements can be represented in a decision tree format (also known as a routing tree). In other words, routing statements are compiled from routing trees.

As those skilled in the art appreciate, the process of composing routing trees is typically a time consuming and tedious process, and requires a high level of skill in routing set logic. Additionally, because of the complexity of the process it is more cumbersome and difficult to make changes in a customer routing scheme. As a result, network customers having more than one call handling destination do not typically have their routing schemes often and quickly revised to reflect changing conditions, and may end up with schemes not ideally suited to their needs.

Figure 2A:
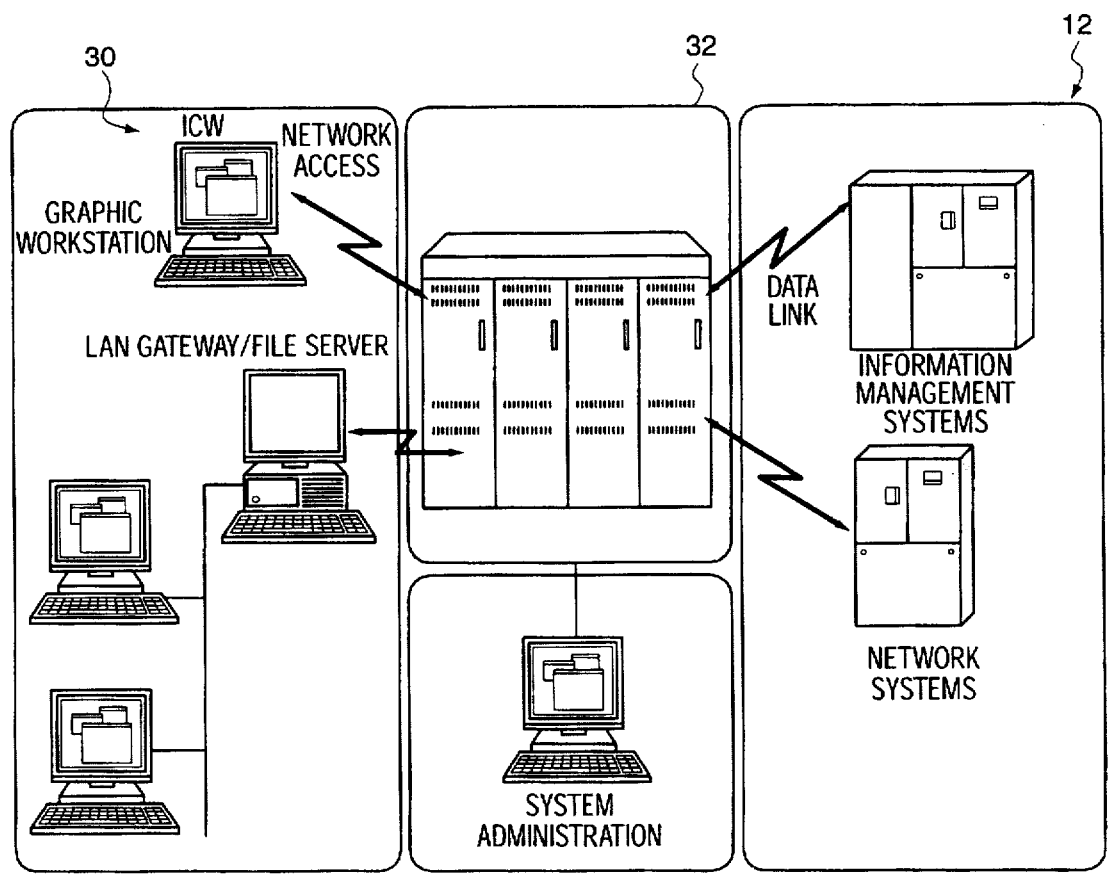
FIG. 2A is a schematic block diagram of the preferred apparatus.
Figure 2B:
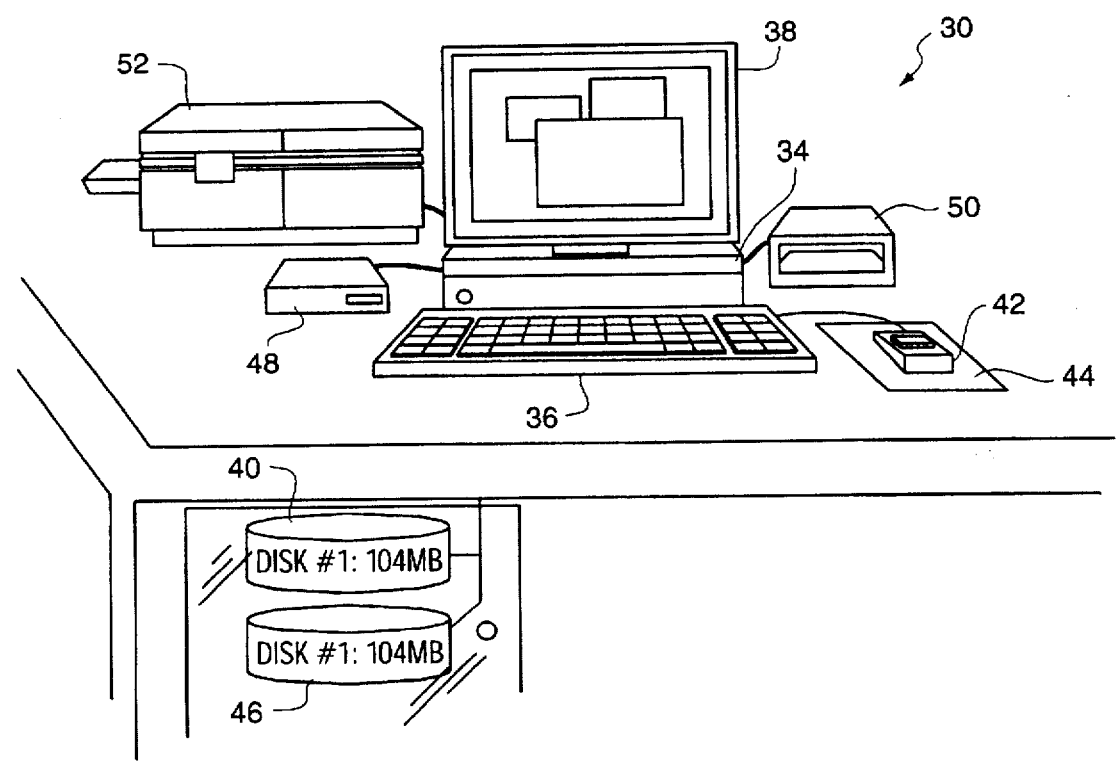
FIG. 2B is a schematic block diagram of the preferred work station.

As shown in FIG. 2, Apparatus 10 includes work station 30, and interface computer 32. Work station 30, typically a suitable UNIX work station such as a Sun Microsystems SPARC station or compatible, includes processor 34 with 32 MB RAM and two EIA 232D serial ports, keyboard 36, 19" color monitor 38, embedded 600 MB disk drive 40, and mouse 42 with digitizer pad 44. Additionally, station 30 includes modem 48 connected to one of the serial ports, a backup tape drive 50, and a conventional PostScript laser printer 52. Of course other computers, input devices, data processing devices or other such devices may be used with the present invention.

Interface computer 32 functions as a store and forward device to transmit transactions from work station 30. Interface communication from the workstation is preferably by way of a dedicated access facility to a public packet data network. Computer 32 is preferably a TANDEM CYCLONE computer. As illustrated in FIG. 2, computer 32 provides the interface with network 12 (FIG. 1), and in particular with database 28. By way of overview, work station 30 presents a series of user friendly graphical images which prompt the customer representative to enter desired customer criteria for the routing of calls placed by dialing the customer's 800 or 900 number, for example. In response, station 30 modifies the graphical images to illustrate the routing criteria entered by the customer, and then, using this criteria, generates a set of routing statements to implement the customer's desired routing while taking into account requirements and limitations of the network. It should be understood that the term customer or user herein may apply equally to actual customers or users of the network performing their own services and also to other users, such as telephone companies or other organizations, which may provide routing control services on behalf of one or more actual users of the network. Interface computer 32 then transmits the routing statements to network 12 for compilation into an executable routing scheme. It should be understood that these routing criteria input by the customer or user are not routing trees or routing statements, instead these are generalized inputs, preferably input by means of graphical objects, on the desired routing typically based on items as: the percent allocation of calls among destinations, the identification of a particular cycle of routing to be associated with a certain time frame, such as by identifying what days the customer would like a certain routing cycle; the identification of different time frames within a routing cycle, such as by identifying the time frames each plan is to be effective for a given daily cycle, and then identifying a routing plan to be associated with each time frame in the routing cycle. The routing plan typically includes information such as the origination regions, customer destination and allocations.

Figure 3:
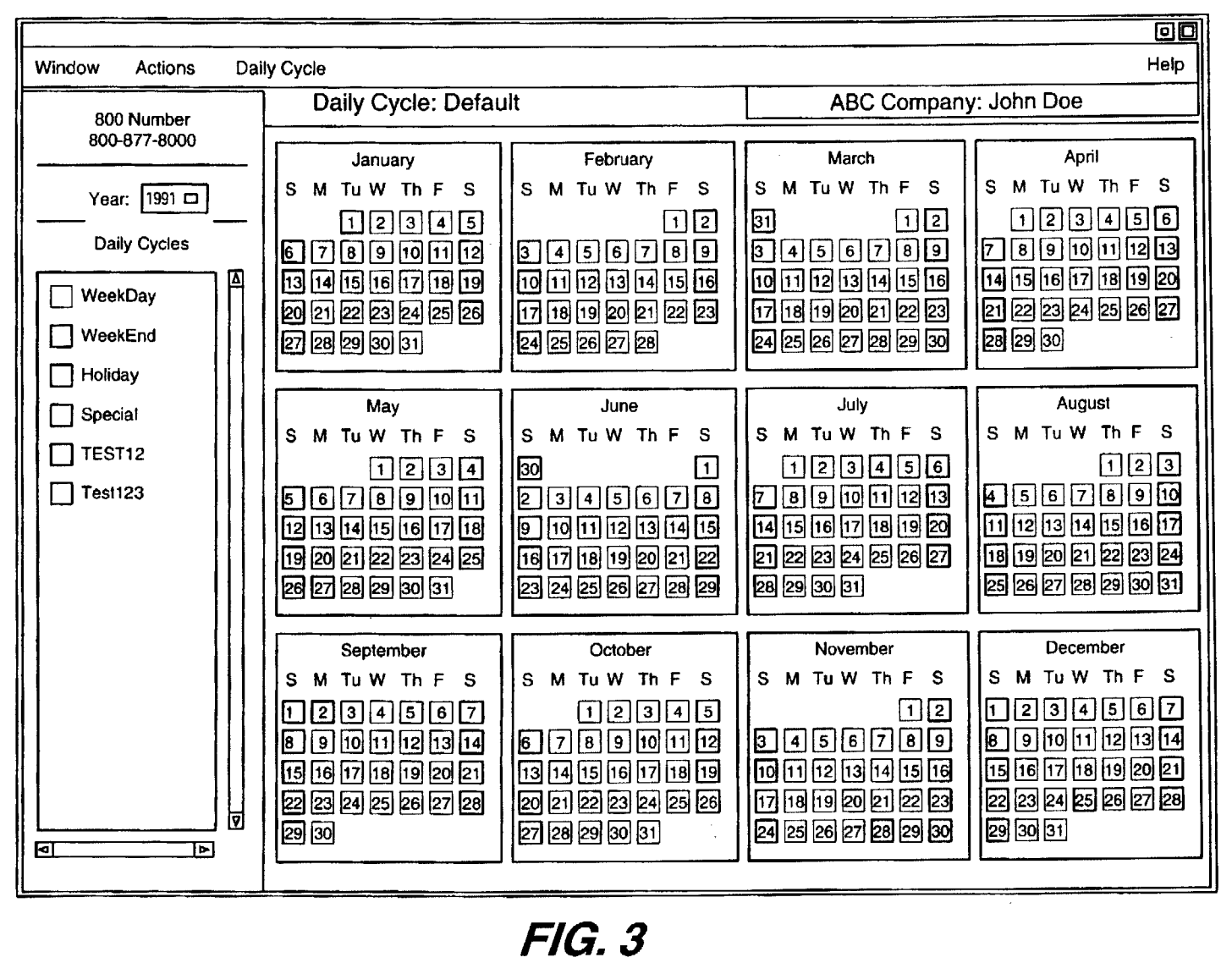
Figure 4:
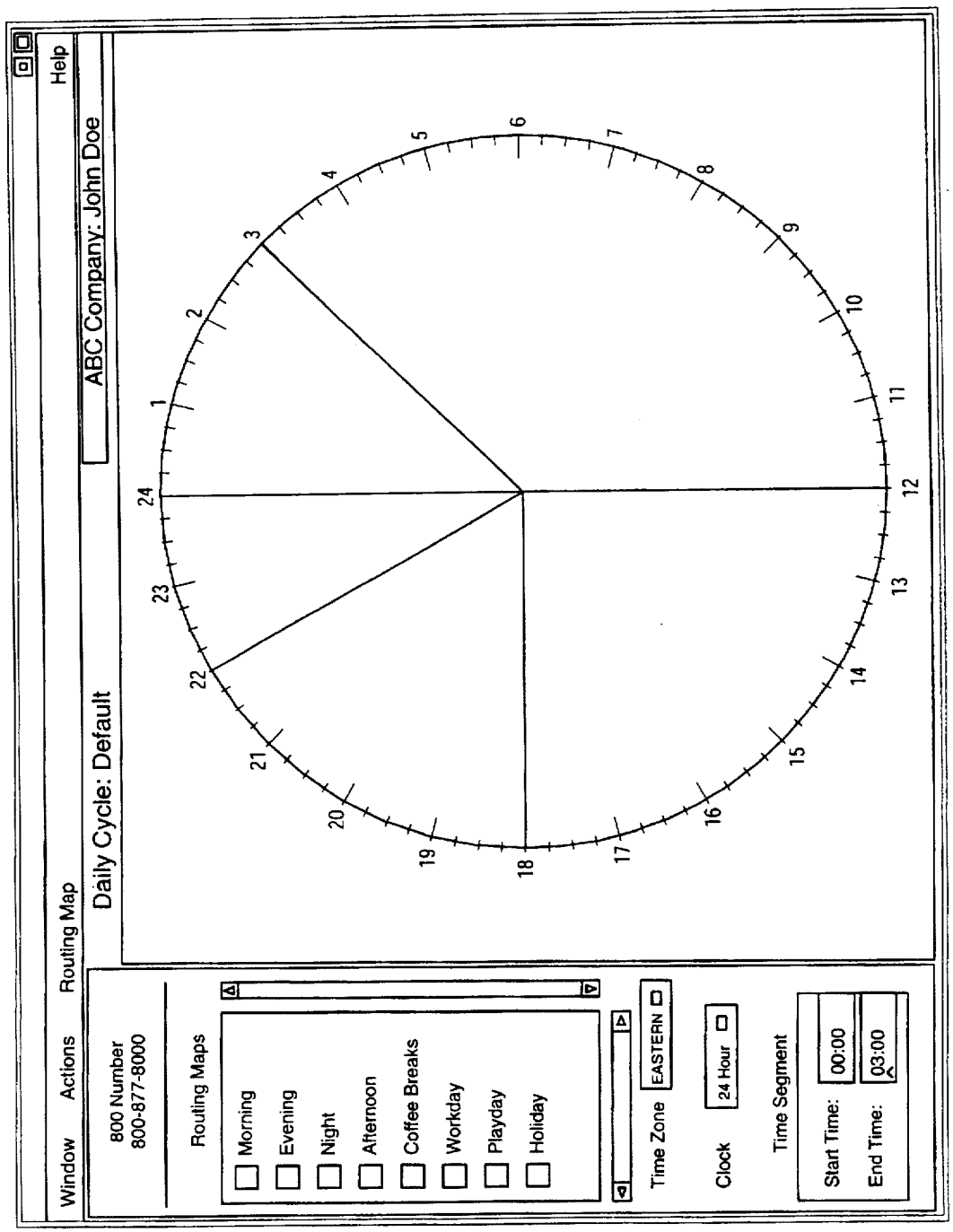
FIG. 4 is an illustration of the preferred clock graphic.
Figure 5:
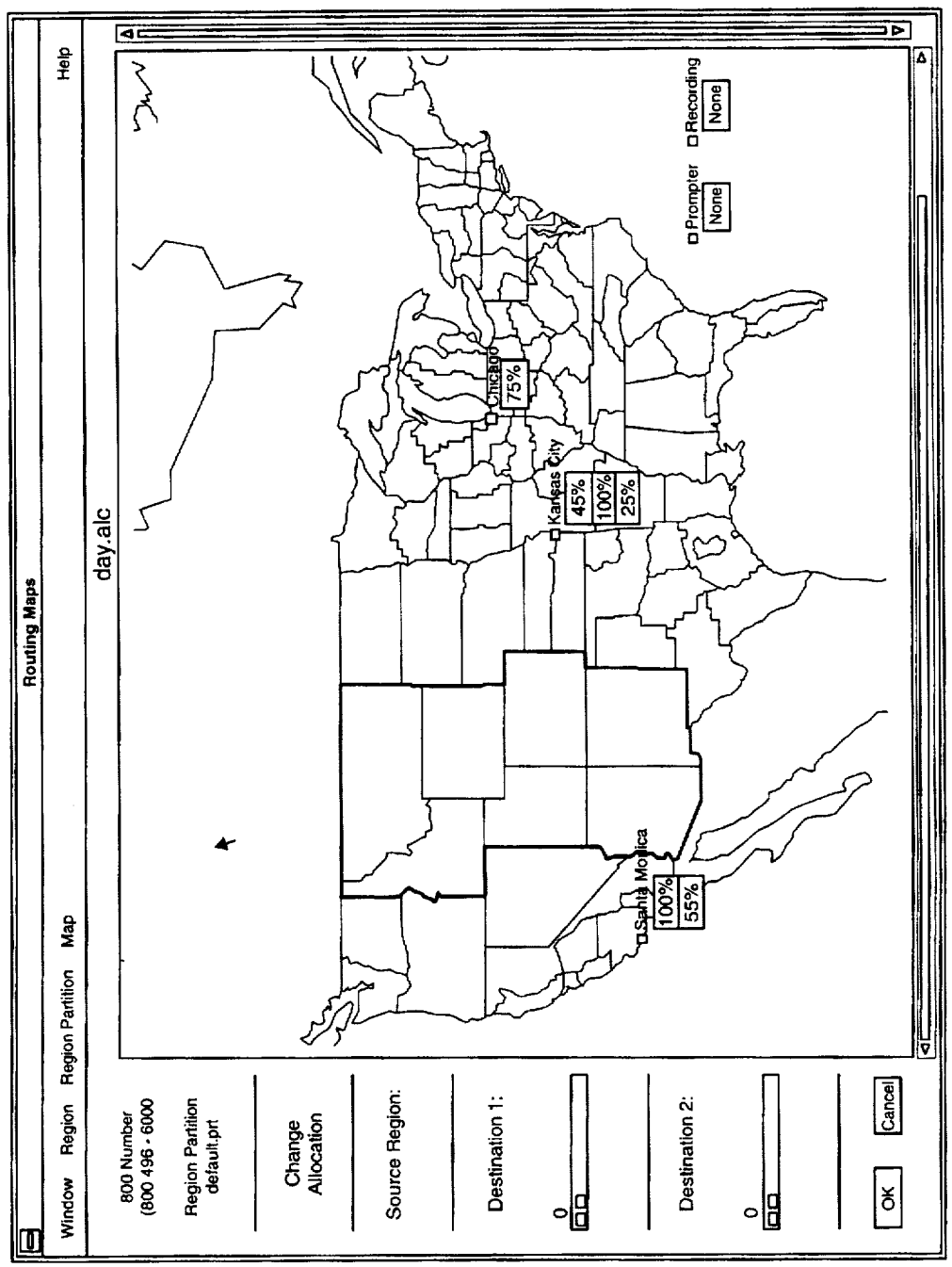
FIG. 5 is an illustration of the preferred geographic map graphic with the preferred allocation icon superimposed thereon.

FIGS. 3-5 illustrate sequential graphical images presented to the customer by work station 30 for use in entering customer defined call routing criteria. However, it should be understood that no special order of steps or processes is required or necessary as a customer may provide for the entry of customer criteria in any order. In particular, the calendar graphic entitled "Routing Plan Calendar" of FIG. 3 is presented to the customer which allows the customer to assign a particular cycle of routing to different time frames. Typically, the user or customer will assign various "daily cycles" to selected calendar days. Preferably, this allows for such an assignment for as much as two years in advance or longer. Other means for assigning cycles other than daily cycles to other time frames are equally applicable. A daily cycle as explained further in connection with FIGS. 4 and 5 is made up of a plurality of specific routing maps associated with corresponding time frames for implementation of the associated map.

In the initial step of FIG. 3, the customer defines as many different types of daily cycles as needed to satisfy the customer's call handling and receiving needs. Each calendar day is then assigned one type of daily cycle. For example, the most common type of daily cycle might be one assigned for ordinary non-holiday, non-special weekdays. The customer, using mouse 36, then assigns this type of daily cycle to the various week days on the calendar. These week days are then identified in some manner such as by highlighting in the same color for ready visual identification. The customer then defines another type of daily cycle which is separately identified, such as by presenting that daily cycle in a different color, and then assigns this second daily cycle to the desired days on the calendar. This process continues until the customer has assigned a daily cycle for a designated period of time such as for calendar days for two years. It should be understood, that different time frames and cycles are equally applicable and in addition different methods of inputing and identifying different cycles and time frames are equally applicable to the present invention. However, the identification and use of daily cycles is advantageous as such is easily combined with the identification of calendar days and calendar graphics for ease of input, understandability and use by the customer.

After defining and assigning the types of daily cycles, work station 30 then presents "clock" graphic as illustrated in FIG. 4, for the customer to specifically configure the various time frames within in a given daily cycle of 24 hours. While the "clock" graphic particularly when used in combination with daily cycles, provides for ease of input and use, of course, other means for receiving the various time frames within some cycle period are equally applicable. Preferably, to avoid confusion between differences in time caused by differences in time zones, one time zone is specified for all daily cycles even though the customer call handling destinations may be located in more than one time zone. As illustrated, each hour of the clock is subdivided into four 15-minute time periods allowing the customer to define a maximum of 96 time frames for a given daily cycle. As illustrated in FIG. 4, four different time frames are illustrated. The first extends from 2200 hours to 0300 hours, the second from 0300 to 1200 hours, the third from 1200 to 1800 hours, and the fourth from 1800 hours to 2200 hours. Other time frames may also be specified. Also, note that each time is preferably identified, such as by color or shading, so that the routing map can be identified which is associated to that time frame.

A routing map is defined and assigned to each time frame. A routing map is the allocation of calls placed from a specified or selected origination region to at least one of the various customer or to selected destinations. However, it should be understood that the map may only include certain customer destinations and the allocation of calls to those destinations of interest. For example, in its simplest form a map could indicate that 100 percent of all calls, without regard to origination region, are directed toward a single destination. To accomplish this, work station 30 presents the routing map, which is preferably a geographical map graphic, illustrated in FIG. 5. It should be understood that the geographical map may display a large geographic region or selected geographical areas, or portions thereof, of interest to the network customer. For the example illustrated in FIG. 5, the customer's three destinations are located in Santa Monica, Kansas City and Chicago. The customer has the option of defining or redefining as needed or desired a plurality of "region partitions" or "origination regions". For example, the customer may define the regions as coincident with time zone boundaries, but may define these boundaries as desired, down to a resolution of NXX which is the local exchange code within an area code (NPA), or an NPA-NXX combination.

The customer decides upon the allocation of the calls originating in a given region to the various destinations. In the example illustrated in FIG. 5, 100% of the calls originating in the west coast region have been allocated to the Santa Monica destination. Additionally, 55% of the calls originating in the Rocky Mountain region have been allocated to Santa Monica and 45% to the Kansas City destination. This "routing map" is a particularly advantageous feature of the present invention. This provides the user with a simple snapshot of the routing plan for any designated time frame. In particular the routing map preferably graphically illustrates the defined origination regions and also illustrates the desired allocation of calls from an origination region to a destination. By graphic illustration it is meant a combination of illustrations, text, and features which do not require the standard use of common routing trees to illustrate a routing plan. The preferred embodiment described herein requires 100% allocation of calls originating in a particular region. For example, if the allocation of calls to Santa Monica is increased to 60%, the allocation to the Kansas City destination is automatically decreased to 40% or if calls are unassigned as indicated in an unassigned block the plan may not be implemented. This advantageous feature reduces a significant possibility of error which may occur in prior art. The clarity and user friendliness is enhanced by color coding of the regions with the allocation graphic box or other suitable identification.

After defining the allocation of calls for each region, the process is repeated for each time frame defined in the daily cycle, and after a routing map has been defined and assigned to each time frame, the process is repeated for the next daily cycle, and so forth until the customer has entered the desired criteria for the entire calendar period of interest. After the customer has initially defined a set of daily cycles, it is especially simple to modify any particular daily cycle, or to reassign daily cycles to additional calendar days, or to reassign certain calendar days with a different daily cycle.

Upon entry of the customer defined routing criteria the computer program in work station 30 uses this criteria to develop the call-handling statements to implement the customer's call handling plan. Therefore, in conventional networking technology, the customer supplied criteria are used to create routing trees from which the routing statements are compiled for use by the network to implement the customer's scheme. However, it should be understood that the present invention is equally applicable to other routing techniques in which a network may use call handling statements other than routing trees or routing statements to implement a customer's routing scheme.

Figure 6:
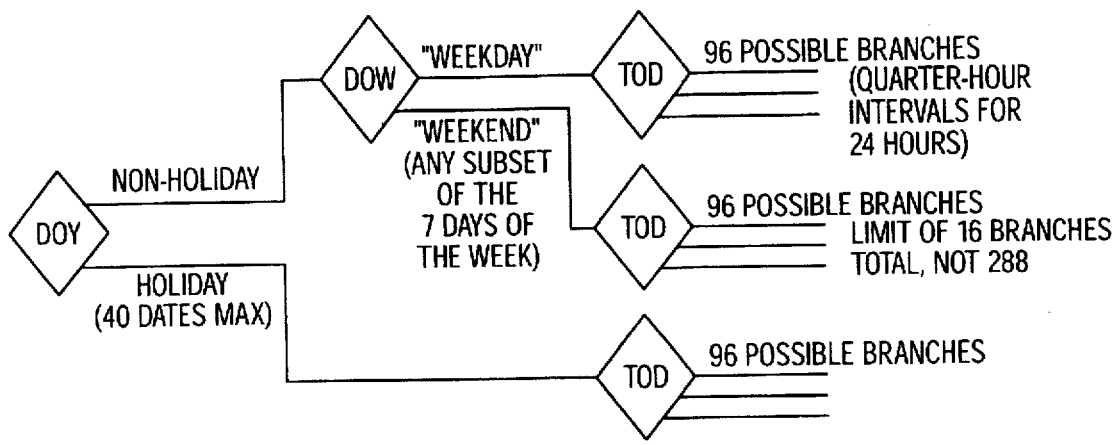
FIG. 6 is a schematic representation of a time feature illustrating the day of week and time of day tests.
Figure 7A:
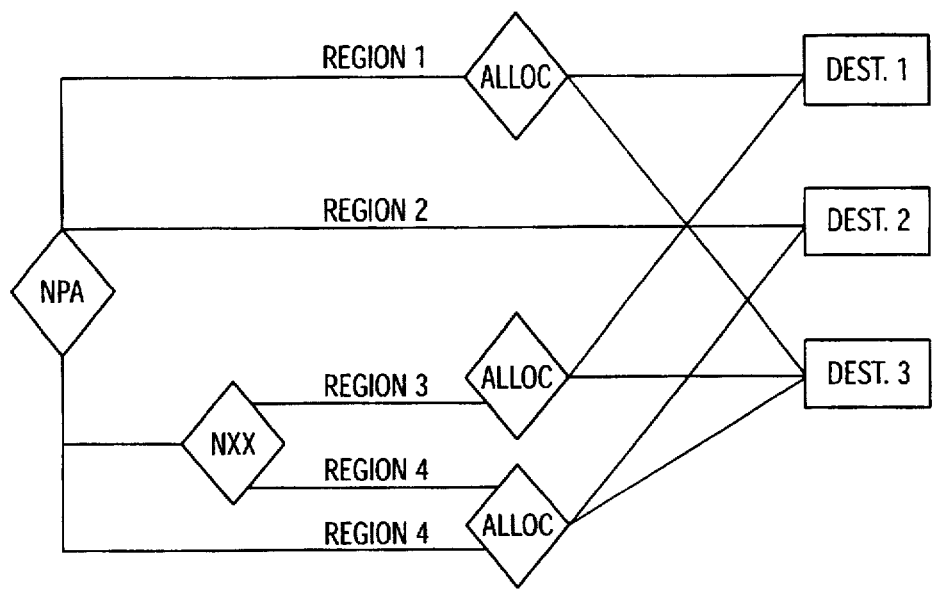
FIG. 7A is a schematic representation of a decision tree illustrating the routing statements for the origination region and allocation tests.

Computer 32 then transmits this set of call-handling statements such as the routing statements to network 12 and prompts the network to compile the statements into executable code for storage in database 28 (FIG. 1). FIGS. 6 and 7a illustrate the desired routing in a decision tree format. The decision tree of FIG. 6 discriminates on the basis of type of day and then up to 96 possible time frames. The time of day branch then leads to an associated routing map, one of which is illustrated by the decision tree of FIG. 7a. The routing map of FIG. 7a first discriminates on the basis of NPA (area code), and then on the basis of NXX (local exchange number), if this level is needed. The allocation decision is then made for routing a call to one of the customer destinations wherein the logical number is retrieved and transmitted to the switch at which the call originated on the network.

Figure 8:
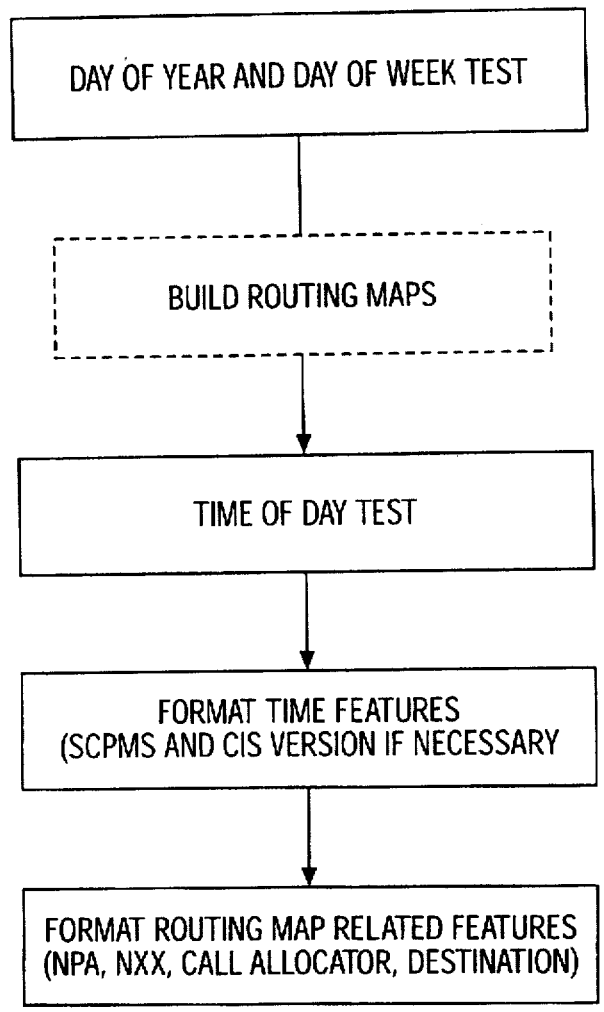
FIG. 8 is a flow chart illustrating an overview of the process for composing a set of routing statements.

In order to compose a set of routing statements or call handling statements using the customer supplied criteria, the limitations of the format of these statements must be taken into account. FIG. 8 illustrates the composition process as an overview. It should be understood that the process or step of composing call handling statements includes the composition of new call-handling statements such as routing tree structures or routing statements from the routing criteria. This composition process or step does not include the mere substitution of data in an existing decision tree structure such as might be used in a step which allows a user to define certain regions in which the user may use the similar or the same routing scheme as used in an existing tree structure. More particularly, FIG. 9 further illustrates the process of composing the routing statements for the day of the year and day of the week tests.

In order to understand the statement composition process more fully, it is helpful to review the format and makeup of an individual routing statement. For example, turning to the first routing statement as shown in Appendix I, the first line is the record identification number T000. The second line is the day of the week (DOW) array. This array includes seven spaces corresponding to the days of the week starting with Sunday in the first space. The presence of a "W" in a day of the week space designates this day as a "weekeNd" (N) day, even though the designated day may not actually be a calendar weekend day. In the example, the first two spaces include a "W" and thereby designate Sunday and Monday as weekend days for the purposes of this particular statement. Blank spaces designate the corresponding day as a "weekdAy" (A). The third portion of the routing statement is a list of designated "Holidays" (H). In the list, the first two digits indicate the month, and the second two digits indicate the day of the month. The next three lines of the statement are designated "normal" (weekday), "weekend" and "holiday". After each line, 96 spaces are allocated corresponding to the allowable 96 15-minute time segments in a 24-hour day starting at midnight. The presence of a letter in a time segment space refers to the Link Tag Table which is the last portion of the routing statement. The entries in the Link Tag Table are record identifications of other routing statements, and are arranged in left to right alphabetical order starting with the first line of the table. Thus, in the "normal" line, the presence of the letter "B" refers to the second entry in the Link Tag Table which is T010 in the example. In the weekend line, the first entry is the letter "C" corresponding to the first 15-minute time period after midnight which designates the third entry in the table, which is T015.

When the set of routing statements is compiled and stored in database 28, the database receives from the call originating switch the date, day of the week, and time of day at which the call was placed. The holiday list is first checked to see if the call was placed on one of the holidays listed. If yes, the holiday line is then checked to retrieve the letter designation corresponding to the time of day at which the call was placed. After retrieving the appropriate letter designation, the corresponding Link Tag Table entry is retrieved and the database then refers to the routing statement identified by this table entry. In this way, the routing statements are logically interlinked and can be represented in a decision tree structure as illustrated in FIGS. 6 and 7a.

If the date on which the call is placed is not on the holiday list, the database then checks the DOW array to determine whether the day of the week on which the call was placed has been designated as a "weekend" day or the space is blank, indicating it is to be treated as a weekday which is read on the "normal" line. After this determination, the normal and weekend lines of the statement are read to retrieve the appropriate Link Tag Table entry corresponding to the time of day. The process then continues to the next routing statement.

From the discussion above, the use of these types of routing statements present some limitations in the way customer supplied criteria can be converted into routing statements which execute the customer's desired plan. Additionally, it is desirable to limit the number of levels in the routing tree structure in order to limit the amount of time required to translate the dialed number into the logical number. With these limitations in mind, the discussion below illustrates the preferred way of composing a routing scheme using the preferred type of routing statement. Those skilled in the art will appreciate that the principles illustrated herein of the present invention are equally applicable to networks using other types of compilable routing configurations.

DAY TESTING

FIG. 8 illustrates a general overview of the process for composing a set of routing statements for implementing the customer's call receiving plan. The day of the year and day of the week tests are first composed, and then the routing map statements. After this, the time of day statements are composed because the number of routing maps required has an impact on the number of levels for time testing. The statements are then formatted for the time tests, and finally the routing map features are formatted.

Figure 9:
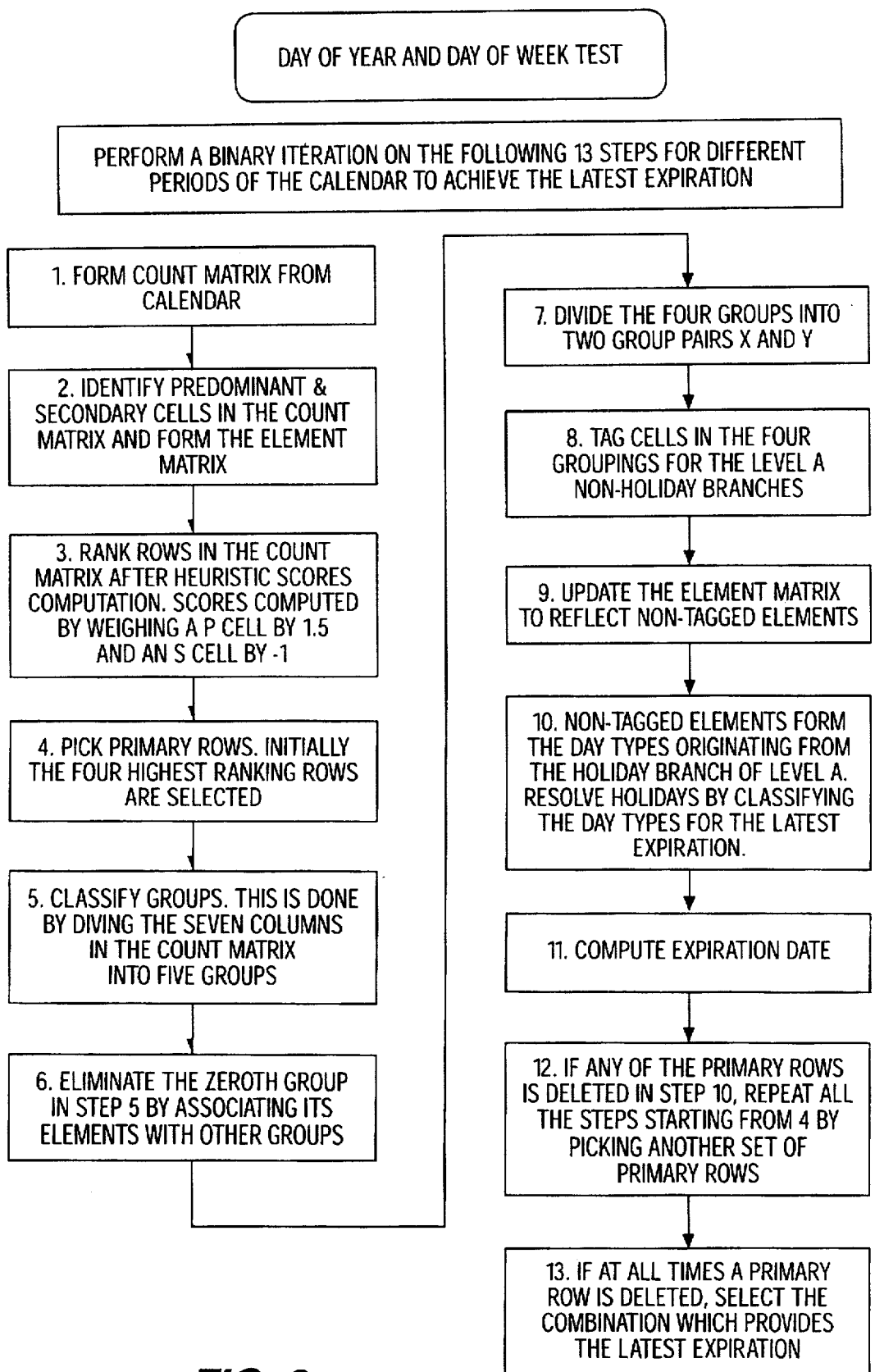
FIG. 9 is a flow chart illustrating the development of routing statements for day of the year and day of the week tests.

FIG. 9 illustrates in more detail the process for composing the day of the year and day of the week tests from which the routing statements are composed. As discussed above, a routing statement first determines whether the current date is one of up to a maximum of 40 designated "holidays". The designation of a particular day as a holiday is completely arbitrary, as is the designation of the day as a weekday or a weekend day. Additionally, the day of the week test also has two possible outcomes, weekday or weekend day. Thus, the day testing can yield three different outcomes: holiday, weekday, or weekend day. For each outcome, time of day testing can identify a maximum 96 time frames—one for each quarter hour of the day. The Link Tag Table, however, limits the maximum number of outputs to 16, not 96. Thus, if more than 16 output branches are needed, statements are "cascaded" into additional levels in the decision tree.

The preferred method allows the duplication of any possible tree-assigned routing scheme using routing statements of the type described herein and using customer defined daily cycles, time frames and associated routing plans. In order to limit the number of levels in the routing tree structure, the preferred method limits the number of decision levels for day testing to two levels. This provides for a maximum of nine types of daily cycles. That is to say, each statement can discriminate between three types of days, and when cascaded at two levels, nine types of daily cycles can be distinguished. It should be noted, however, that this does not limit the customer from defining more than nine daily cycles because the preferred method stores that portion of the calendar exceeding nine types of daily cycles for later composition. This is accomplished automatically when the last day of the currently composed set of statements is reached. Thus, this limitation is transparent to the customer.

As mentioned above, the types of days that can be distinguished by a statement decision level include holiday, weekday and weekend day designated as H, A, and N respectively. With two levels of decision tree structures, nine possible two-letter combinations are possible: HH, HA, HN, AH, AA, AN, NH, NA, and NN corresponding to a maximum of nine different types of daily cycles.

The first step in developing the day testing is to analyze the customer defined types of daily cycles in the calendar order starting with the soonest day using a so-called "count matrix". The count matrix is composed by counting the number of different types of daily cycles occurring on each day of the week, and putting this number in the appropriate matrix cell. An example of a count matrix is shown as follows:

| DAY TYPE | DAY OF WEEK | | | | | | |
|---|---|---|---|---|---|---|---|
| | Su | M | T | W | Th | F | Sa |
| A | 0 | 10 | 0 | 0 | 0 | 0 | 0 |
| B | 0 | 27 | 15 | 0 | 0 | 0 | 5 |
| C | 0 | 0 | 37 | 47 | 47 | 10 | 0 |
| D | 0 | 0 | 0 | 0 | 0 | 42 | 0 |
| E | 0 | 0 | 0 | 0 | 0 | 0 | 47 |
| F | 32 | 16 | 0 | 0 | 0 | 0 | 0 |

-continued

| DAY TYPE | DAY OF WEEK | | | | | | |
|---|---|---|---|---|---|---|---|
| | Su | M | T | W | Th | F | Sa |
| G | 20 | 0 | 0 | 0 | 0 | 0 | 0 |
| H | 0 | 0 | 0 | 5 | 5 | 0 | 0 |
| I | 0 | 0 | 1 | 0 | 0 | 0 | 0 |

The count matrix has nine rows, A–I, corresponding to the maximum number of types of daily cycles. The preferred method first attempts to find four daily cycles that are DOW separable, that is, four mutually orthogonal rows, and designate these rows as "primary rows." To be DOW separable, daily cycles need to be assigned two dates that occur on disjoint subsets of the seven days of the week. In the count matrix there are 126 possible ways of selecting four primary rows. To reduce the complexity of this task, the largest cell number occurring in each day of the week column is designated as a "P" cell and all other non-zero entries marked as "S" as follows:

| DAY TYPE | DAY OF WEEK | | | | | | |
|---|---|---|---|---|---|---|---|
| | Su | M | T | W | Th | F | Sa |
| A | 0 | 10 S | 0 | 0 | 0 | 0 | 0 |
| B | 0 | 27 P | 15 S | 0 | 0 | 0 | 5 S |
| C | 0 | 0 | 37 P | 47 P | 47 P | 10 S | 0 |
| D | 0 | 0 | 0 | 0 | 0 | 42 P | 0 |
| E | 0 | 0 | 0 | 0 | 0 | 0 | 47 P |
| F | 32 P | 16 S | 0 | 0 | 0 | 0 | 0 |
| G | 20 S | 0 | 0 | 0 | 0 | 0 | 0 |
| H | 0 | 0 | 0 | 5 S | 5 S | 0 | 0 |
| I | 0 | 0 | 1 S | 0 | 0 | 0 | 0 |

For each row A–I, a score is computed as 1.5×the number of P cells in the row minus the number of S cells in the row. Zero cells count as zero. In the matrix, only five rows have P cells and so only five rows will have a positive score. The highest scoring rows are considered candidates for selection as primary rows. In the example, rows C, D, E, and F are the four highest ranked rows and are the first choice as the primary rows, with row B being the fifth candidate.

Next, the seven day of the week columns are divided into five groups according to the following criteria:

| Group 0: | Column in which no primary row has P cells |
| Group 1: | Columns in which the first primary row has P cells |
| Group 2: | Columns in which the second primary row has P cells |
| Group 3: | Columns in which the third primary row has P cells |
| Group 4: | Columns in which the fourth primary row has P cells |

The P cells of groups 1–4 will eventually be tagged as AA, AN, NA, and NN, although not necessarily in that order. The S cells of groups of 1–4 are provisionally tagged as H and will eventually bear one of the designations AH, NH, HA, HN, and HH. The group 0 columns will be assigned to one or more of groups 1–4. The AH and NH designations can support a maximum of 40 holiday designations each, while the HA, HN, and HH designations can together support only 40 holiday designations. If any one column has the limit of three H designations, then one of these cells must be designated AH or NH.

First, the group 0 columns are assigned to one or more of groups 1–4. This is accomplished using just the primary rows which represent the day types that will eventually carry the non-H designations. For the group 0 column, the largest S cell is identified in one of the primary rows C–F. The P cell for this row is identified along with the group to which that P cell belongs. The group 0 column is assigned to the group identified P cell. The largest primary row S cell in the group 0 column is provisionally remains tagged as an S cell, but all other cells (both S and P) in the assigned column are provisionally marked as an H cell. This procedure is repeated for the other group 0 columns. In the count matrix example, there is only one group 0 column which has an S cell in the primary row F which remains identified as an S cell. The other non-zero cells in the column are marked as H cells, and the column is designated in group 4. This is illustrated as follows:

| | DAY OF WEEK AND GROUP | | | | | | |
|---|---|---|---|---|---|---|---|
| DAY | 4 | 4 | 1 | 1 | 1 | 2 | 3 |
| TYPE | Su | M | T | W | Th | F | Sa |
| A | 0 | 10 H | 0 | 0 | 0 | 0 | 0 |
| B | 0 | 27 H | 15 H | 0 | 0 | 0 | 5 H |
| C | 0 | 0 | 37 P | 47 P | 47 P | 10 H | 0 |
| D | 0 | 0 | 0 | 0 | 0 | 42 P | 0 |
| E | 0 | 0 | 0 | 0 | 0 | 0 | 47 P |
| F | 32 P | 16 S | 0 | 0 | 0 | 0 | 0 |
| G | 20 H | 0 | 0 | 0 | 0 | 0 | 0 |
| H | 0 | 0 | 0 | 5 H | 5 H | 0 | 0 |
| I | 0 | 0 | 1 H | 0 | 0 | 0 | 0 |

If more than five rows contain H cells, rows are deleted starting with the lower most row until no more than five rows contain H cells. If a primary row is deleted during this process, the next highest scoring set of primary rows is selected and the process repeated. In the example above, the I row is deleted because it is the sixth row containing an H cell. With this deletion, all seven columns are divided into the four groups 1–4.

Next, the four groups must be divided into two pairs wherein each pair will share the designation A or N. With four groups, three ways are possible to define two pairs. Only those rows containing H cells are considered. To select the proper pair, the following matrix is used:

| | Pairing I | | Pairing II | | Pairing III | |
|---|---|---|---|---|---|---|
| | Pair A 1 + 2 | Pair B 3 + 4 | Pair A 1 + 3 | Pair B 2 + 4 | Pair A 1 + 4 | Pair B 2 + 3 |
| A | 0 | 10 | 0 | 10 | 10 | 0 |
| B | 15 | 32 | 20 | 27 | 42 | 5 |
| C | 10 | 0 | 0 | 10 | 0 | 10 |
| G | 0 | 20 | 0 | 20 | 20 | 0 |
| H | 10 | 0 | 10 | 0 | 10 | 0 |

The pairing is selected to maximize the number of day types supported. First, the pairing is selected that has at least one row each in the form (XO) or (OY). If none of the pairings satisfy this condition, only three day types can be defined. Initially, the program selects the pairing that has the largest value of X or Y. In the event of a tie, the pairing presenting the largest sum of the X and Y value is used. In the example above, all three pairings have at least one (XO) and one (OY) row, and all three pairings present a maximum sum of X+Y=30. Because all three pairings are equal according to the criteria, the first pairing is selected by default.

With this pairing selected, that is, groups 1 and 2 in pair A, and groups 3 and 4 in pair B, a 5×2 matrix is presented. The largest (XO) row is selected and identified as the "X" row and the largest (OY) row is selected and identified as the "Y" row. In the example, row H is the X row, and row G is the Y row. The various cells are then identified as follows:

| Pair A, first Group, P and S cells | ———>AA |
|---|---|
| Pair A, second Group, P and S cells | ———>AN |
| Pair B, first Group, P and S cells | ———>NA |
| Pair B, second Group, P and S cells | ———>NN |
| Pair A, Row X, H cells | ———>AH |
| Pair B, Row Y, H cells | ———>NH |

| DAY | DAY OF WEEK | | | | | |
|---|---|---|---|---|---|---|
| TYPE | Su | M | T | W | Th | F | Sa |
| A | 0 | 10 S | 0 | 0 | 0 | 0 | 0 |
| B | 0 | 27 P | 15 S | 0 | 0 | 0 | 5 S |
| C | 0 | 0 | 37 P | 47 P | 47 P | 10 S | 0 |
| D | 0 | 0 | 0 | 0 | 0 | 42 P | 0 |
| E | 0 | 0 | 0 | 0 | 0 | 0 | 47 P |
| F | 32 P | 16 S | 0 | 0 | 0 | 0 | 0 |
| G | 20 S | 0 | 0 | 0 | 0 | 0 | 0 |
| H | 0 | 0 | 0 | 5 S | 5 S | 0 | 0 |

Rows A, B, and C still contain cells provisionally marked as H cells. In order to finalize designation of cells, the following H matrix is used:

| | Su | M | T | W | Th | F | Sa |
|---|---|---|---|---|---|---|---|
| A | 0 | 10 H | 0 | 0 | 0 | 0 | 0 |
| B | 0 | 27 H | 0 | 0 | 0 | 0 | 5 H |
| C | 0 | 0 | 0 | 0 | 0 | 10 H | 0 |

If this matrix has only one row, all of the H cells are marked as HA. If the matrix has only two rows, the H cells in the first row as HA and as HH in the second row. If a third row is present as illustrated, these H cells are marked as HN. If more than three rows are presented, rows are deleted from the bottom until only three rows remain. With three H matrix rows determined, the weekday/weekend test must be able to separate any two rows of the H matrix, which is to say, two orthogonal rows of the H matrix must be determined. This is accomplished by computing the H dot product of all pairs of two rows of the H matrix, which is the number of columns in which both rows of a pair have an H cell. As a result of determining a pair or rows that has a zero H dot product, the H cells in the first row of this pair are finally marked as HA, and the H cells in the second row marked as HN. The remaining H cells in the third row are marked HH.

The final result of the cell marking process is illustrated as follows:
(Note that row I has been deleted):

| | DAY OF WEEK AND GROUP | | | | | | |
|---|---|---|---|---|---|---|---|
| DAY | 4 | 4 | 1 | 1 | 1 | 2 | 3 |
| TYPE | Su | M | T | W | Th | F | Sa |
| A | 0 | 10 H | 0 | 0 | 0 | 0 | 0 |
| B | 0 | 27 H | 15 H | 0 | 0 | 0 | 5 H |
| C | 0 | 0 | 37 AA | 47 AA | 47 AA | 10 H | 0 |
| D | 0 | 0 | 0 | 0 | 0 | 42 AN | 0 |
| E | 0 | 0 | 0 | 0 | 0 | 0 | 47 |

-continued

| | DAY OF WEEK AND GROUP | | | | | | |
|---|---|---|---|---|---|---|---|
| DAY | 4 | 4 | 1 | 1 | 1 | 2 | 3 |
| TYPE | Su | M | T | W | Th | F | Sa |
| | | | | | | | NA |
| F | 32 NN | 16 NN | 0 | 0 | 0 | 0 | 0 |
| G | 20 NH | 0 | 0 | 0 | 0 | 0 | 0 |
| H | 0 | 0 | 0 | 5 AH | 5 AH | 0 | 0 |

With completion of the count matrix, the decision tree structure can be defined which is configured in levels. The first level determines the day of the year and the third level determines the day of the week. These two levels are defined first because a second level may not be necessary if no daily cycle has more than 16 time frames. This is because the routing statement format only provides 16 Link Table outputs.

Referring to the count matrix, days of the week having AA or AN entries in any cell of the column are designated as first level A days. Days of the week having NA or NN entries in any cell of the column are designated as first level N days.

Next, days of the week having AA entries in any column cell are designated as third level A days on the first level A day branch. Days of the week having AN entries in any column cell are designated as third level N days on the first level A day branch.

Days of the week having NA entries in any column cell are designated third level A days on the first level N branch. Days of the week having NN entries in any column cell are designated as third level N days on the first level N branch.

Finally, days of the week having an HA entry in any column cell are designated as third level A days on the first level H branch. Days of the week having HN entries in any column cell are designated as third level N days on the first level H branch.

In the cell designation process discussed above, the limitation of a maximum of 40 H days was not taken into account. To accommodate this limitation, the calendar days are inspected in order while also referring to the count matrix until a day is encountered that does not have a two-letter designation. This is the expiration date of the decision tree. Additionally, each time a two-letter designation is encountered having an H, a date is added to the list of first or third level holidays depending upon whether the H is the first or second letter. When either H list reaches a total of 41, this is the expiration date of the calendar. Calendar days beyond the expiration date for which a daily cycle has been assigned are stored in memory and are automatically recomposed just prior to the expiration date.

ROUTING SETS GENERATION—ROUTING MAPS PORTION

A typical routing map would have many regions some of which may be partitioned across NXX's of an NPA. Calls from each of these regions might be allocated among one or more destinations. The NPA, NXX, call allocation and destination features are used to generate routing statements to represent any routing map.

In FIG. 7A, a logical representation of a routing map is shown. In this routing map, four regions are present of which one (or more) NPA is divided between two regions for NXX routing. Calls originating from region 1 are allocated to both destination 1 and 3. Similarly calls originating from regions 3 are allocated to destinations 1 and 3, and calls originating from region 4 are allocated to destinations 2 and 3. Calls originating from region 2 is allocated completely to destination 2.

The routing statements used to represent this routing map are generated in exactly the same way as that of the logical representation in FIG. 7A. An NPA feature is used to represent the assignments of all the NPA's among the different regions. Since one NPA is divided among two regions, an NXX feature is used to accomplish this division and appropriate assignments are made for all the NXX's among the two regions. FIG. 7A illustrates three regions having calls allocated to multiple destinations. Hence, these allocations are represented using the call allocation features. Similarly, the three destinations are represented in the "destination feature" along with additional information pertaining to each particular destination.

The representation of the destination feature is accomplished as follows:

1. Three destinations are used, so three destination features are generated for each of them. These destination features include information related to the destination numbers.

2. Destinations 1 and 3 are used by region 1. An allocation feature is generated with the identifications (ID's) of appropriate destination features tagged with the appropriate percentage allocation (a link tag table is present in the allocation feature which allows for the specification of the percentage and an ID for a following routing statement).

3. Destinations 1 and 3 are also used by the region 3. An allocation feature is generated with the ID's of the appropriate percentage allocation. If the percentages allocated to each of these two destinations are the same for both region 1 and region 3, the allocation feature generated in step 2 is shared by both region 1 and 3.

4. Destinations 2 and 3 are used by region 4 using an allocation feature generated as explained in step 2.

5. An NPA feature is used to divide all the NPA's into different regions. Since an NPA is NXX routed, an NXX feature is used to do a similar division of NXX's in the NPA onto region 3 and 4. The allocation feature ID for region 1 is tagged for all the NPA's belonging to this region in the NPA feature. Because all calls from region 2 are routed to destination 2, the destination feature ID of this destination is tagged to all the NPAs belonging to this region in the NPA feature. Similarly the allocation feature ID for region 4 is tagged to all NPAs belonging to this region in the NPA table. Because an NPA is NXX routed, the allocation feature ID of region 3 is tagged to all the NXXs in that NXX feature which belong to region 3. Similarly, the allocation feature ID of region 4 is tagged to all the NXXs in that NXX feature which belongs to that region. Finally, the NXX feature ID is tagged to the NPA of the NPA which is NXX routed in the NPA feature. (a link tag table is also present in NPA and NXX feature similar to that present in other routing statements described earlier).

In generating the routing statements for the complete routing plan, all routing maps are processed in a fashion similar to that illustrated above. For optimization, all duplicate routing statements are eliminated. This elimination is achieved dynamically as these routing statements are generated. Whenever a new routing statement is built (in the fashion explained above), a comparison is made between the new routing statement and all the routing statements of that type already generated. If absolute similarity is found in this comparison, the new routing statement is abandoned and the ID of the routing statement found to be similar is used for all purposes where the ID of the new routing statement was intended to be used. While comparing either of NPA or NXX features, the comparison is limited to the link tag entries in each feature because all the logical information pertaining to these features is confined to those entries. While comparing the call allocation feature, the comparison is limited to both the link tag entries and the percentage allocations.

By generating routing statements this way, further optimization is achieved by the elimination of all logically redundant features. If there is only one region in a routing map, both the NPA and NXX features are eliminated. If 100 percent of calls from a region are routed to only one destination, the allocation feature is eliminated.

Figure 7B:
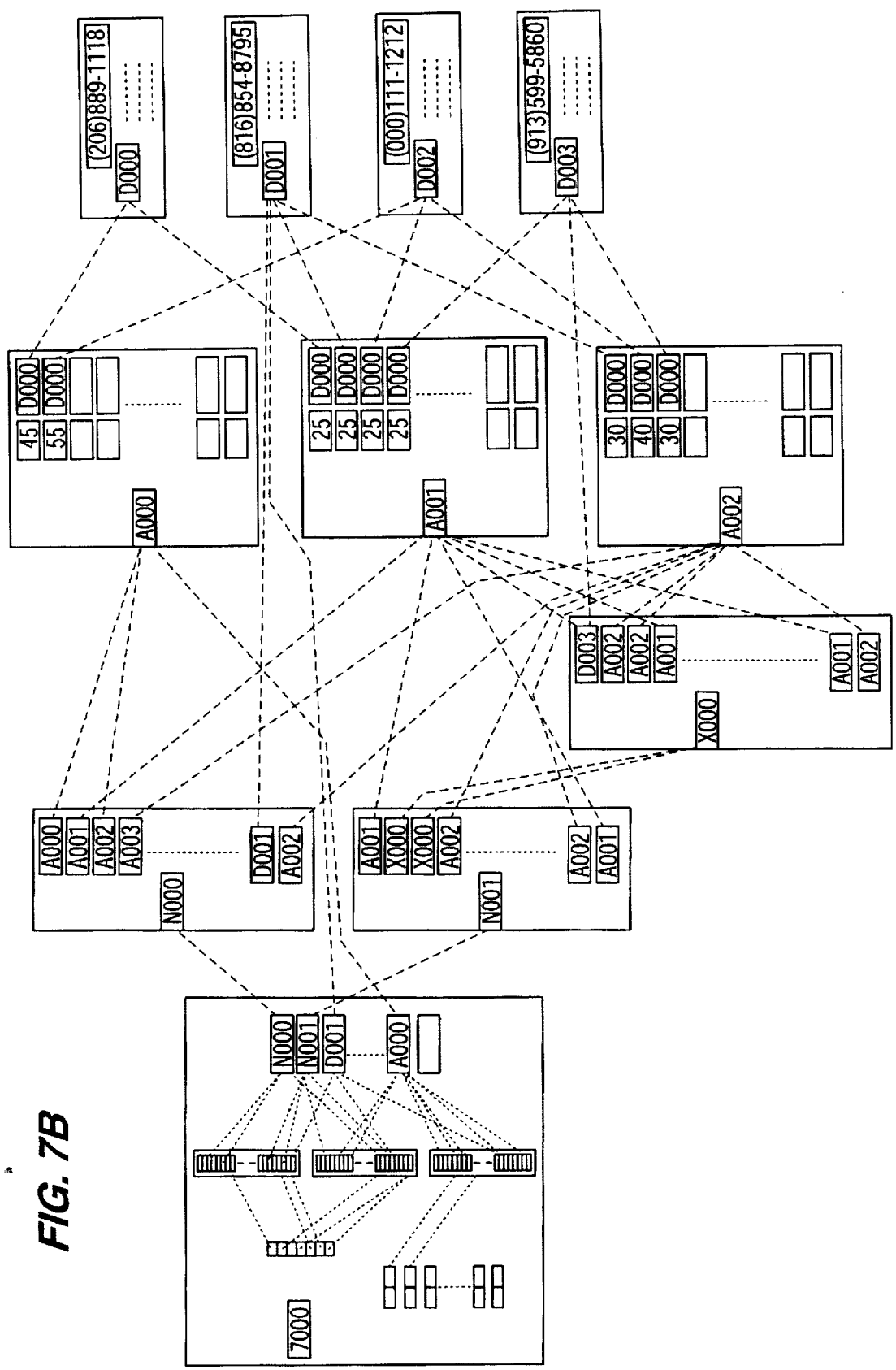
FIG. 7B is a schematic representation of an example routing tree.

FIG. 7B illustrates an example routing tree which includes three daily cycles which have four unique routing maps. This results in only one time feature. The block in the left most column represents the time feature. The holiday list is in the bottom left portion of that block and the DOW array is next to the time feature ID (T000). The time slots (normal, weekend, holiday) are stacked vertically next to the DOW array (each of these have 96 slots). The link tag table with 16 entries for this time feature is at the right most portion of this block.

The four routing maps are represented by the four entries in the link tag table (N000, N001, D001, A000). The first routing map includes starting feature N000 has four regions (entries A000, A001, A002, D001). The NPA feature is N000 and its logically significant portion is represented by its link tag table with 160 entries, each of which corresponds to each of the 160 possible NPA's. In the first region, calls are allocated among two destinations. This call allocation is accomplished through the call allocation features. These features have 100 link tag entries with percentages assigned to each of them. These percentages provide a total of 100%. The destinations are represented by the destination features, with the destination translation numbers shown. Similarly the second routing map illustrates calls equally divided among four destinations. The third routing map illustrates all calls routed to destination represented by D001.

Starting from N001, the second routing has three regions. Few NPAs in this routing map are NXX routed. The NXX routing is represented by an NXX feature which has 800 link tag entries corresponding to all the 800 possible NXXs. These NPA's are routed in a manner such that so both the NPAs share that NXX feature—X000. By coincidence the NXX features for both of them are found to be unique.

Furthermore, one NXX in the NXX routed NPA's has all its calls allocated to one destination.

The other two routing maps (starting from A000 and D001) in this plan have only one region. Furthermore, one of these two maps (starting at D001) has all its calls routed to only one destination—D001 which means that the customer wants all the calls at a particular time segment on a particular day to be routed to only one destination.

ROUTING MAP SUBTREE AND TIME OF DAY TESTING

As mentioned above, FIG. 7A illustrates a routing map subtree which is also composed from routing statements. In this portion of the preferred method, unneeded decision levels are omitted in order to speed the decision process. This omission could even include the NPA decision point if the customer has not specified regional partitions. As mentioned above, the decision tree for day of year and day of week is initially composed with two decision levels. Whether a third decision is needed for time of day testing depends upon the number of routing maps, that is to say, the number of routing plans that have been defined by the customer.

Step 1. In order to complete composition of the time of day portion of the decision tree, the daily cycle types are ranked as groups according to the first letter in the two-letter designation, and according to the order of the first occurrence on the calendar. For example, the group AA, AN, or AH, would be designated A*. Next, a blank 3×96 global time test matrix is created which, when completed, defines the time testing for the decision tree. Each row of the time test matrix defines which third level routing statement is to be linked with one of the ranked daily cycle types (A*, N*, or H*). The following table illustrates a completed 3×96 matrix for use in the example discussed herein:

```
###########################################################
Global Time Test Matrix:

0    1    2    3    4    5    6    7    8    9    0    *    *    2    3    !

Normal    !OTP QOTP QOTP QOTP QOTP QOTP QOTP QOTP QOTP QOTPQ  *    *    *   RUS SRUS S!

Weekend   !DE ABDE ABDE ABDE ABDE ABDE ABDE ABDE ABDE ABDE AB  *    *    *   FGCDFGCD!

Holiday   !HI J MHI J MHI J MHI J MHI J MHI J MHI J MHI J MHI J M  *  *  *   KLLNKLLN!

Link Tag Table!
   !T005!   !T010!   !T015!   !T020!   !T025!   !T030!   !T035!   !T040!
   !T045!   !T050!   !T055!   !T060!   !T065!   !T070!   !T075!   !T080!
   !T085!   !T090!   !T095!   !T100!   !T105!   !   !    !   !    !   !
###########################################################
```

Step 2. Next, a third level 3×96 matrix for the highest ranking group day type is created that defines which routing plan is used for each quarter hour for each of the three day types included in this group. For example, if the highest ranking group is N*, then the associated day types are NA, NN, and NH. The following table illustrates this example:

```
###############################################################
    Level 3 N* Time Test matrix:
    This table uses two-letter tags AA through DX
              0     1     2     3     4     5     6     7***3    3***   9***        3  
    Normal    !AAAAAAAAAAAAAAAAAAAAAAAAAAAABB***BBCC***CCDD***DDDDD!
              !ABCDEFGHI JKL MNOPQRSTUVWXYZAB***YZAB***YZAB***MOPQR!
    Weekend   !DDDDDDDDDDDDDDDDDDDDDDDDDDDDDDDDDDDDDDD   ***  DDDDDDDDD!
              !STUVSTUVSTUVSTUVSTUVSTUVSTUVSTUVSTUVS  ***  VSTUVSTUV!
    Holiday   !DDDDDDDDDDDDDDDDDDDDDDDDDDDDDDDDDDDDDDDD  ***  DDDDDDDDD !
              !WXUVWXUVWXUVWXUVWXUVWXUVWXUVWXUVWXUVWXUVW  ***  VWXUVWXUV !
    Link Tag Table:
      !D005 !   !D006 !   !D007 !   !D008 !   !D009 !   !D00A !   !D00B !   !D00C !
      !D00D !   !D00Z !   !D00F !   !D00G !   !D00H !   !D00I !   !D00J !   !D00K !
      !D00L !   !D00M !   !D00N !   !D00O !   !D00P !   !D00Q !   !D00R !   !D00S !
      !D00T !   !D00U !   !D00V !   !D00W !   !D00X !   !D00Y !   !D00Z !   !D010 !
      !D011 !   !D012 !   !D013 !   !D014 !   !D015 !   !D016 !   !D017 !   !D018 !
      !D019 !   !D01A !   !D01B !   !D01C !   !D01D !   !D01E !   !D01F !   !D01G !
      !D01H !   !D01I !   !D01J !   !D01K !   !D01L !   !D01M !   !D01N !   !D010 !
      !D01P !   !D01Q !   !D01R !   !D01S !   !D01T !   !D01U !   !D01V !   !D01W !
      !D01X !   !D01Y !   !D01Z !   !D020 !   !D021 !   !D022 !   !D023 !   !D024 !
      !D025 !   !D026 !   !D027 !   !D028 !   !D029 !   !D02A !   !D02B !   !D02C !
      !D02D !   !D02E !   !D02F !   !D02G !   !D02H !   !D02I !   !D02J !   !D02K !
      !D02L !   !D02M !   !D02N !   !D02O !   !D02P !   !D02Q !   !D02R !   !D02S !
      !D02T !   !D02U !   !D02V !   !D02W !   !D000 !   !D001 !
    ###############################################################
```

The matrix example shows the third level N*, time test matrix. The top row which is the NA row, has 96 different entries corresponding to 96 different routing plans associated with 96 different time frames for the NA day type. Of course, it would be extraordinarily rare for a customer to define the maximum of 96 different time frames in a daily cycle type. This example, however, is used to illustrate the handling of the highest complexity situation. The 96 different entries are linked to routing plans designated D005 through D02S in the Link Tag Table.

The second row is the NN row of the third level N* matrix and has four different entries which are linked to routing plans D02T, D02U, D02V, and D02W. The third row is the NH row and also has four different entries linked to routing plans D000, D001, D02V, and D02W. These also appear cyclically every hour for a 24-hour period.

Step 3. Next, a subset of the 96 quarter hour time periods is assigned to each of several third level routing statements in a way that takes into account the maximum of 16 allowable Link Tag Table entries.

Step 3a. To do this, an initially blank 3×96 time test matrix is created. In the example, the first third level statement is T005. A completed example is shown as follows:

The matrix column having the minimum number of different routing plan designations is identified. The routing plans in this column are lettered in alphabetical order. In the example, for the time period between 0030 and 0045 (the third column), two different types of routing plans labeled "C", "U", and "U": for the Normal, Holiday and Weekend columns are designated respectively as A, B, and B, where A is linked to D007, and B is linked to D02V.

Step 3b. This column is then marked as being assigned.

Step 3c. This column is then added to the global matrix with the associated plans added to the third level link tag list.

Step 3d. Additionally, this column is linked to the first and second levels. The third level designation in the form Txxx is added to the Link Tag Table of the global matrix. The matching tag letter in the A column is entered in the global matrix. In the example, an "A" is placed in the 0030 to 0045 column of the N* row of the global matrix, and the designation T005 placed in the first slot of the Link Tag Table which is the "A" location.

Step 3e. Next, the third level test matrix is again inspected for the next column which has the minimum number of new, that is, not already designated routing plans. In the case of a tie, the earliest occurring column is selected. In the example, the next column which has the minimum number

```
###############################################################
    Record ID -           !T005!
    DOW array -           ! W    !
    Holiday List:
      !0101!  !0000!  !0000!  !0000!  !0000!  !0000!  !0000!  !0000!  !0000!  !0000!
      !0000!  !0000!  !0000!  !0000!  !0000!  !0000!  !0000!  !0000!  !0000!  !0000!
      !0000!  !0000!  !0000!  !0000!  !0000!  !0000!  !0000!  !0000!  !0000!  !0000!
      !0000!  !0000!  !0000!  !0000!  !0000!  !0000!  !0000!  !0000!  !0000!  !0000!
             0      1     2     3      4     5     6      7     8     9     0     1     2     3    ***   2    3   !
    Normal:  ! A     C     D     E      F     G     H      I     J     K     L     M     N    O                   !
    Weekend: ! B     B     B     B      B     B     B      B     B     B     B     B     B    B                   !
    Holiday: ! B     B     B     B      B     B     B      B     B     B     B     B     B    B                   !
    Link Tag Table:
      !D007!   !D02V!   !D00B!   !D00F!   !D00J!   !D00N!   !D00R!   !D00V!
      !D00Z!   !D013!   !D017!   !D01B!   !D01F!   !D01J!   !D01N!   !D01R!
    ###############################################################
``` of new routing plans contains the designations "G" "U" and "U" which is the column between 0130 and 0145.

Step 3f. Steps 3b–3e are repeated until the 17th tag is needed, which indicates that the Link Tag Table limit of 16 has been exceeded. This last column is left unassigned in the current third level routing statement. In the example, the third level matrix can accommodate a minimum of five columns and 15 columns are assigned to T005 before running out of branches. Note that there are 15 "A's" in the data for T000 in the N* row in each of the 15 columns handled by T005.

Step 3g. Steps 3a–f are repeated for the third level routing statement for the AA, AN, and AH day types. In the example, this is T010. In the example, another 15 columns are assigned to T010 and these are linked to T010 using 15 "B's" in the N* row of the global matrix which can be seen in the data for T000.

Step 3h. Step 3g is then repeated until all of the columns in the original third level test matrix are assigned. This results in between one and twenty, third level routing statements for the N* day types, plus a fully completed N* row in the global matrix. In the example, designations T005–T035 cover the 96 columns for the N* day types. The third level data are linked to the global matrix using tag letters A–G.

Step 4. Steps 3–3h are then repeated for the second ranked group day type which in the example is H*. This results in one to twenty, third level statements for the H* day types, plus a fully completed H* row in the global matrix. In the example, designations T040–T070 cover the 96 columns of the H* day types and are tied to the global matrix using tag letters H through N.

Step 5. Steps 3–3h are repeated for the third ranked group day type which in the example is for group A*.

Step 6. After completion of the above steps, a complete set of routing statements for the third level is complete plus first and second levels in the global matrix and Link Tag Table. If the global matrix has 16 or fewer Link Tag Table entries, the process is complete because the first level can support 16 links without cascading with an intervening second level.

If, however, the global table has more than 16 entries, which in the example has 21 entries, one or more second level routing statements must be composed to feed the third level statements. The global matrix defines which third level statements are used for each quarter-hour time segment for each of the three first level day types (A*, N*, H*). To begin, a single first level routing statement is created and identified as T000 with an initially blank 3×96 time test matrix.

Step 6a. The number of table entries in the global matrix are counted for each of the three group day types, and the following are defined:

k1=number of entries for first-ranked group day type.
k2=number of entries for second-ranked group day type.
k3=number of entries for third-ranked group day type.

In the example, k1=k2=k3=7 because each of the three group day types requires 7 third level routing statements. Assuming that second level routing statements are used to feed the third level statements for the second and third ranked group day types, the number of first level branches required are k2/16 for the second-ranked group day type, and k3/16 for the third-ranked group day type. This leaves 16 minus k2/16 minus k3/16=M as the number of branches available for the firs-ranked group day type.

Step 6b. Next, a check is made as to whether M branches are sufficient to handle the third level first-ranked group day type without any second level routing statements. As to say, the number of entries for the N* day type are checked in the global matrix table to see if the number of entries is less than or equal to M. In the example, this is true because 7<12. Because this is true, a second level routing statement is not needed for the N* day type. Next, the N* row of the global matrix is copied to the first level routing statement T000. This N* row of the global matrix is then marked as being "assigned". In the example, the copied entries include T005–T035 which uses up 7 of the 16 available Link Tag Table entries.

If the number of M branches are insufficient to handle the first-ranked group day type, an additional one or two second level routing statements will be needed. If needed, these statements would not need any holiday or weekend day testing because the A*, N*, or H* identification is complete. Additionally, only the "A" row of quarter-hour time segment need to be completed, because the default date testing forces use of the A row.

To add a second level routing statement, an initially blank statement is created. In the example, statement T110 is created which in turn feed three sets of third level statements: T005–T035, T040–T070, and T075–T105. Statement T110 is required in the example because of 20 third level statements are included in the A* day type. This newly created second level statement is created to handle 16 of these 20 A* types.

Initially the first 16 A* third level tags from the global table are copied to the Link Tag Table of the second level statement T110. These are the entries corresponding to the letters O–T which are the 15th through the 21st entries in the global matrix table. Noting which quarter-hour columns of the A* row in the global matrix the third level tags are used, the tag letter needed to feed the specified third level statement in each of these respective columns, in the A row of statement T110. These cells of the global matrix are then marked as assigned.

In the example, the letter codes O–T used in the A* row of the global matrix are translated into A–G in the A row of statement T110. These second level tags are then added to the initially blank first level table (T000). For each cell of the global matrix that was just marked as assigned, the corresponding cell in the first level matrix is completed with the corresponding letter reference of statement T110. That is to say, T110 is added as the 15th entry (letter O), in the table of T000 and all columns of the A* row of T000 are filled with the letter O.

If any A* third level tags from the global matrix remain, another second level statement is created and the remaining tags placed in this additional second level statement using the same process as described above.

Step 6c. The second-ranked group day type is next processed. The remaining unused, first level table entries are M1 where M=M1−k3/16 which is the number of first level branches available for use by the second-ranked day type. Using this value for M, step 6b is repeated for this day type. In the example, enough branches are left to handle the needed 7 used by the H* day type, and thus, no additional second level statement is needed for this day type.

Step 6d. For the remaining third-ranked day type, M=M2 where M2 is the number of remaining unused entries in the first level table (T000). Using this value of M, step 6b is repeated for the remaining day type. In the example, not enough branches remain to handle the 7 used by the A* day type. As a result, second level statement T110 was created.

With completion of step 6d, the entire set of routing statements is complete. The third level statements were completed after step 5, and the routing plan subtrees were created prior to the time of day testing.

After composition of the set of routing statements needed to implement the customer's desired call receiving and handling plan, work station 30 transfers the statements set to computer 32, which in turn transmits the set to the network for compilation into executable code and storage in database 28. Those portions of the customer entered criteria exceeding the allowable nine types of daily cycles are stored in the memory of work station 30 or other suitable storage location until the last day of the currently composed calendar is reached. Work station 30 then automatically recomposes the next portion of the calendar, again up to the maximum allowable number of daily cycle types. In this way, this limitation is transparent to the customer.

SECOND EMBODIMENT

In the embodiment described above, work station 30 includes the computer program for composing a set of routing statements from customer supplied criteria. As can be appreciated from the description above, a complete set of routing statements is a lengthy and complex data set and can take longer than 30 minutes in some cases for transmission over the network for subsequent relay to the various network switches. Additionally, each work station 30 must have the capability of storing the required program and the generated data which adds to the cost of each work station.

The preferred second embodiment described herein includes a centralized mainframe computer such as a Tandem as the preferred platform for the program for composing routing statements from customer or user supplied criteria. This centralized computer communicates over the network with the customer-cited work stations for receiving criteria therefrom and for supplying updated data thereto. Additionally, the central computer communicates over the network with switches 14-18 for transmitting composed routing statement sets thereto. The preferred work stations of the second embodiment include a program for generating the background graphics and for storing the specific data to be displayed in graphical form.

In operation, a customer's work station is initialized with data from the central computer. This data is time and date stamped and reflects the current status of the customer's routing scheme which can be displayed as described above. Whenever a customer calls up a specific graphic which requires displayed data, the work station queries the central computer as to whether the information to be displayed is the most recent. The query includes the time and date stamp of the data stored at the work station. If this data is the most recent, the central computer affirms. If not, the most recent data is transmitted over the network to the work station. In this way, communication time between the central computer and the work station is minimized because only updated information need be transmitted.

When the customer enters new criteria into the work station indicating a change in the routing scheme, this criteria is time and date stamped and transmitted to the central computer. With this arrangement, only changes in criteria are transmitted which again minimizes transmission time between the work stations and the central computer.

Upon receipt of new or changed customer-supplied criteria, the composition program in the central computer composes a new set of routing statements reflecting the new or changed criteria. This new set of routing statements is then transmitted over the network to various network switches for use in routing calls according to the customer designed scheme as determined by the criteria entered through the work stations.

As those skilled in the art will appreciate, a given customer may have a plurality of work station sites for receipt of new or changed routing criteria. For example, each call-receiving destination may have a work station for entering criteria reflecting local conditions and a corporate headquarters may also have a work station for entering criteria reflecting corporate wide conditions. In such cases, the date and time stamps on the data becomes advantageous because one customer site may be attempting to enter criteria in conflict with that being entered at another customer site. With the date and time stamp associated with the data, each customer site is assured of seeing the most recent data. In other words, as discussed above, each work station queries the central computer to be sure it has the most recent data before displaying that data.

The use of a mainframe computer is also advantageous in that it provides the most efficient and fastest platform for converting routing criteria into routing statements. This is because a mainframe computer typically is much faster than a personal computer and handles data transactions on a much more efficient basis. Additionally, centralization may provide for ease of administration and allow a convenient method to enable customer service representative to obtain access to the screens viewed by the customer for problem verification or to respond to other queries. Efficiency is enhanced because idle time on the mainframe can be used for other network tasks when not composing routing statements. Thus, the advantages of both speed and efficiency are gained.

As those skilled in the art will appreciate, the present invention encompasses many variations in the preferred embodiment described herein. For example, other networks may use other types of routing statements or their equivalent and the principles taught herein are equally applicable. Additionally, other user friendly graphics may be devised sufficient for entry of customer routing criteria. Furthermore, the preferred device for receiving user call-routing criteria and compiling routing statements therefrom could be included as part of the network with the user provided only with a data entry terminal.

APPENDIX I

```
##############################################################################
Record ID =        !T000!
DOW Array =        !WW     W!
holiday List:
    !0101!   !0102!   !0115!   !0119!   !0122!   !0129!   !0130!   !0205!   !0212!   !0216!
    !0129!   !0130!   !0205!   !0212!   !0216!   !0219!   !0226!   !0312!   !0316!   !0326!
    !0219!   !0226!   !0312!   !0316!   !0326!   !0327!   !0402!   !0403!   !0409!   !0410!
    !0327!   !0402!   !0403!   !0409!   !0410!   !0416!   !0420!   !0423!   !0430!   !0514!
             !0   1    2    3    4    5    6    7    8    9   * * *   7    8    9    1    2    3  !
Normal:    ! BBBB BBBB BBBB BBBB BBBB BBBB BBBB BBBB BBBB  * * *  BBBB BBBB BBBB BBBB BBBB BBBB BBB !
weekend:   ! CCCC CCCC CCCC CCCC CCCC CCCC CCCC CCCC CCCC  * * *  CCCC CCCC CCCC CCCC CCCC CCCC CCC !
holiday:   !AAAAAAAAAAAAAAAAAAAAAAAAAAAAAAAAAAAAAAAAAAAA   * * *  AAAAAAAAAAAAAAAAAAAAAAAAAAAAAAA  !
Link Tag Table:
    !T005!   !T010!   !T015!    !   !    !   !    !   !    !   !    !   !    !   !
    !   !    !   !    !   !     !   !    !   !    !   !    !   !    !   !    !   !

##############################################################################
Record ID =        !T005!
DOW Array =        !       W  !
Holiday List:
    !0101!   !0205!   !0528!   !0625!   !0702!   !0000!   !0000!   !0000!   !0000!   !0000!
    !0000!   !0000!   !0000!   !0000!   !0000!   !0000!   !0000!   !0000!   !0000!   !0000!
    !0000!   !0000!   !0000!   !0000!   !0000!   !0000!   !0000!   !0000!   !0000!   !0000!
             !0   1    2    3    4    5    6    7    8    9   0    1    * * *  1    2    3    7!
Normal:    !AGCEAGCEAGCEAGCEAGCEAGCEAGCEAGCEAGCEAGCEAGCEAG  * * *  AGCEAGCEAGCE!
weekend:   !BHDFBHDFBHDFBHDFBHDFBHDFBHDFBHDFBHDFBHDFBHDFBH  * * *  BHDFBHDFBHDF!
holiday:   !BI CEBI CEBI CEBI CEBI CEBI CEBI CEBI CEBI CEBI CEBI   * * *  BI CEBI CEBI CE!
Link Tag Table:
    !D006!   !D000!   !D005!   !D002!   !D009!   !D003!   !D007!   !D001!
    !D004!   !   !    !   !    !   !    !   !    !   !    !   !    !   !

##############################################################################
Record ID =        !T010!
DOW Array =        !       W  !
Holiday List:
    !0214!   !0222!   !0704!   !0000!   !0000!   !0000!   !0000!   !0000!   !0000!   !0000!
    !0000!   !0000!   !0000!   !0000!   !0000!   !0000!   !0000!   !0000!   !0000!   !0000!
    !0000!   !0000!   !0000!   !0000!   !0000!   !0000!   !0000!   !0000!   !0000!   !0000!
             !0   1    2    3    4    5    6    7    8    9   0    1    2    3    4    5    6   7
Normal:    !AEHCAEHCAEHCAEHCAEHCAEHCAEHCAEHCAEHCAEHCAEHCAE  * * *  CAEHCAEHCAEHC!
Weekend:   !HBCEHBCEHBCEHBCEHBCEHBCEHBCEHBCEHBCEHBCEHBCEHB  * * *  EHBCEHBCEHBCE!
holiday:   !BGJ DBGJ DBGJ DBJ DBGJ DBGJ DBGJ DBGJ DBGJ DBGJ   * * *  BGJ DBGJ DBBGJ D!
Link Tag Table:
    !D000!   !D006!   !D003!   !D009!   !D001!   !D004!   !D007!   !D002!
    !D005!   !D008!   !   !    !   !    !   !    !   !    !   !    !   !

##############################################################################
Record ID =        !T015!
DOW Array =        !WW      !
Holiday List:
    !0114!   !0121!   !0128!   !0204!   !0211!   !0218!   !0225!   !0304!   !0311!   !0610!
    !0218!   !0225!   !0304!   !0311!   !0610!   !0617!   !0624!   !0701!   !0708!   !0715!
    !0617!   !0524!   !0701!   !0708!   !0715!   !0000!   !0000!   !0000!   !0000!   !0000!
    !0000!   !0000!   !0000!   !0000!   !0000!   !0000!   !0000!   !0000!   !0000!   !0000!
             !0   1    2    3    4    5    6    7    8    9   0    1    * * *  1    2    3   !
Normal:    !GACEGACEGACEGACEGACEGACEGACEGACEGACEGACEGACE    * * *  ACEGACEGAC!
Weekend:   !HBCEHBCEHBCEHBCEHBCEHBCEHBCEHBCEHBCEHBCEHBCE    * * *  BCEHBCEHBC!
holiday:   !I ADFI ADFI ADFI ADFI ADFI ADFI ADFI ADFI ADFI ADF   * * *  ADFI ADFI AD!
Link Tag Table:
    !D004!   !D001!   !D002!   !D005!   !D003!   !D009!   !D000!   !D00A!
    !D006!   !   !    !   !    !   !    !   !    !   !    !   !    !   !
```

Having thus described the preferred embodiment of the present invention, the following is claimed as new, and desired to be secured by Letters Patent:

1. A method for processing telecommunication network user routing criteria, the system comprising:

displaying routing criteria through a geographic display indicating origination regions, user destinations, and an allocation of calls from the origination regions to the user destinations;

modifying the routing criteria displayed, and composing at least one call-handling statement based on the modified routing criteria being displayed.

2. A method for operating a telecommunications network wherein the network is operable to route calls from origination regions to a plurality of user associated destinations for calls directed to a user associated number, the calls being routed according to call-handling statements, the method comprising:

displaying images representing geographical areas in a criteria-handling device;

receiving user routing criteria that are associated with the geographical areas into the criteria-handling device; and composing at least one call-handling statement in the criteria-handling device based on the routing criteria wherein the call-handling statement is configured for use by the network to route calls.

3. The method of claim 2 wherein displaying the images comprises displaying images representing geographical areas indicating the origination regions and the user destinations.

4. The method of claim 2 wherein displaying the images comprises displaying images representing geographical areas indicating area codes.

5. The method of claim 2 wherein displaying the images comprises displaying images representing geographical areas indicating area codes and local exchange codes.

6. The method of claim 2 wherein displaying the images comprises displaying images representing geographical areas indicating an allocation of calls from the origination regions to the user destinations.

7. The method of claim 2 wherein displaying the images further comprises displaying images representing clocks and calendars.

8. The method of claim 7 wherein displaying the images representing clocks and calendars comprises displaying images of an allocation of calls from origination regions to user destinations assigned to a time frame of a daily cycle, and of the daily cycle assigned to a calendar day.

9. The method of claim 2 further comprising displaying images as modified by the user routing criteria.

10. The method of claim 2 wherein displaying the images comprises displaying images incorporating user routing criteria previously input by the user.

11. The method of claim 2 wherein receiving the routing criteria comprises receiving an allocation of calls from the origination regions to the user destinations.

12. The method of claim 11 wherein receiving the allocation comprises receiving the allocation based on percentage.

13. The method of claim 11 wherein receiving the allocation comprises receiving an allocation of calls from originating area codes.

14. The method of claim 11 wherein receiving the allocation comprises receiving an allocation of calls from local exchange codes.

15. The method of claim 11 wherein receiving the routing criteria comprises receiving an assignment of the allocation to a time frame, an assignment of the time frame to a daily cycle, and an assignment of the daily cycle to a calendar day.

16. The method of claim 2 wherein composing at least one call-handling statement comprises modifying existing call-handling statements based on the user routing criteria.

17. The method of claim 2 wherein composing at least one call-handling statement comprises:

composing the call-handling statement configured for determining an appropriate daily cycle based on a date of a call;

composing the call-handling statement configured for determining an appropriate time frame based on a time of the call and the appropriate daily cycle;

composing the call-handling statement configured for determining an appropriate allocation based on an origination region of the call and the appropriate time frame; and composing the call-handling statement configured for determining a destination based on the appropriate allocation.

18. A system for processing telecommunication network user routing criteria, the system comprising:

a computer including a central processing unit, a memory, and a display;

a first means for displaying a plurality of geographical maps each indicating origination regions, user destinations, and an allocation of calls from the origination regions to the user destinations;

a second means for receiving user routing criteria into the computer, the routing criteria being associated with the geographical maps being displayed; and a third means for composing at least one call-handling statement in the computer based on the routing criteria wherein the call-handling statement is configured for use by a network to route calls.

19. The system of claim 18 further comprising:

a fourth means for displaying a plurality of daily cycles each including a plurality of time frames wherein the time frames indicate assignments of particular maps to particular time frames and daily cycles; and a fifth means for displaying a calendar wherein the calendar indicates assignments of particular daily cycles to particular calendar days.

20. The system of claim 18 wherein at least one geographical map is of the United States.

21. The system of claim 18 wherein at least one geographical map is of a region of the United States.

22. The system of claim 18 wherein at least one geographical map is of North America.

23. The system of claim 18 wherein at least one geographical map is of Europe.

24. The system of claim 18 wherein at least one geographical map is of the World.

25. The system of claim 18 wherein at least one origination region is represented by an area code.

26. The system of claim 18 wherein at least one origination region is represented by a local exchange code.

27. The system of claim 18 wherein the allocation is represented based on percentage.

28. The system of claim 18 wherein the time frames are displayed by fifteen minute increments.

29. The system of claim 18 wherein the daily cycles are displayed by twenty-four hour clocks.

30. The system of claim 18 further comprising a means for displaying modifications to the first means in response to modifications to the routing criteria.

* * * * *